United States Patent
Sakurai et al.

(10) Patent No.: US 9,569,835 B2
(45) Date of Patent: Feb. 14, 2017

(54) PATTERN EXTRACTING APPARATUS AND METHOD

(75) Inventors: Shigeaki Sakurai, Koto-ku (JP); Rumi Hayakawa, Yokohama (JP); Seiji Egawa, Fuchu (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 147 days.

(21) Appl. No.: 14/124,100

(22) PCT Filed: May 25, 2012

(86) PCT No.: PCT/JP2012/003433
§ 371 (c)(1),
(2), (4) Date: Dec. 5, 2013

(87) PCT Pub. No.: WO2012/169137
PCT Pub. Date: Dec. 13, 2012

(65) Prior Publication Data
US 2014/0112549 A1     Apr. 24, 2014

(30) Foreign Application Priority Data

Jun. 8, 2011   (JP) ................................ 2011-128596

(51) Int. Cl.
*G06K 9/00*    (2006.01)
*G06T 7/00*    (2006.01)
(Continued)

(52) U.S. Cl.
CPC ............. *G06T 7/001* (2013.01); *G06K 9/6226* (2013.01); *G06Q 30/0201* (2013.01)

(58) Field of Classification Search
None
See application file for complete search history.

(56) References Cited

U.S. PATENT DOCUMENTS

2002/0184083 A1  12/2002  Nakano et al.
2003/0004652 A1*  1/2003  Brunner et al. ................ 702/19
(Continued)

FOREIGN PATENT DOCUMENTS

EP   1 376 397 A2   1/2004
JP   2003 76937    3/2003
(Continued)

OTHER PUBLICATIONS

Tan et al. "Introduction to Data Mining," textbook published in 2005. Chapter 6 included.*
(Continued)

*Primary Examiner* — Amir Alavi
(74) *Attorney, Agent, or Firm* — Oblon, McClelland, Maier & Neustadt, L.L.P.

(57) ABSTRACT

A pattern extracting apparatus includes a first storing section storing plural target information pieces, a candidate pattern producing section producing candidate patterns each including two or more items different from each other based on each of the items included in the plural target information pieces, a candidate evaluation value calculating section calculating an extraction evaluation value of the candidate pattern based on a frequency of appearance at which the produced candidate pattern appears in the plural target information pieces, a pattern extracting section determining and extracting any of the candidate patterns having the calculated extraction evaluation value satisfying a predetermined threshold value, and a second storing section storing an association degree between the items. The candidate evaluation value calculating section calculates the extraction evaluation value based on a weight based on an identified association degree between the items included in the candidate pattern and the frequency of appearance.

8 Claims, 14 Drawing Sheets

(51) Int. Cl.
*G06Q 30/02* (2012.01)
*G06K 9/62* (2006.01)

(56) References Cited

U.S. PATENT DOCUMENTS

2009/0164284 A1 6/2009 Koiso et al.
2010/0306029 A1 12/2010 Jolley
2012/0278320 A1 11/2012 Ogura

FOREIGN PATENT DOCUMENTS

JP 2009-199446 A 9/2009
WO WO 2010/140504 A1 12/2010

OTHER PUBLICATIONS

Buckles et al. "Mining Negative Association Rules," 2002.*
Unil Yun, On Identifying Useful Patterns to Analyze Products in Retail Transaction Databases, IEICE Transactions on Information and Systems, vol. E92-D, No. 12, Dec. 1, 2009, pp. 2430-2438 and cover pages.
International Search Report Issued Jun. 26, 2012 in PCT/JP12/003433 Filed May 25, 2012.
International Search Report issued Jun. 26, 2012 in PCT/JP2012/003433 with English Translation.
Feng Tao et al., "Weighted Association Rule Mining Using Weighted Support and Significance Framework", KDD '03 Proceedings of the Ninth ACM SIGKDD International Conference on Knowledge Discovery and Data Mining [online], ACM, 2003, pp. 661-666.
Unil Yun, "On Identifying Useful Patterns to Analyze Products in Retail Transaction Databases", IEICE Transactions on Information and Systems, vol. E92-D, No. 12, Dec. 1, 2009, pp. 2430-2438 and cover pages.
Jungja Kim et al., "Weighted Association Rule Mining for Item Groups with Different Properties and Risk Assessment for Networked Systems", IEICE Transactions on Information and Systems, vol. E92-D, No. 1, Jan. 1, 2009, pp. 10-15 and cover pages.
Takashi Yamamoto et al., "Heuristic Rule Weight Specification for Fuzzy Rule-Based Classification Systems", Journal of Japan Society for Fuzzy Theory and Intelligent Informatics, vol. 16, No. 5, Oct. 15, 2004, pp. 441-451 and cover pages.
Shu Yue Joyce et al., "Mining Fuzzy Association Rules with Weighted Items", Systems, Man and Cybernetics, 2000 IEEE International Conference on [online], vol. 3, Jun. 14, 2012, pp. 1906-1911.

* cited by examiner

FIG.2

| TRANSACTION NUMBER | ITEM LIST (PURCHASE LIST) |
|---|---|
| A01 | CHICKEN, TUNA, MACKEREL, BEER |
| A02 | CHICKEN, PORK, BEER |
| A03 | CHICKEN, PORK, TUNA, BEER |
| A04 | BEEF, MACKEREL |
| A05 | CHICKEN, TUNA, MACKEREL |

FIG.3

|         | CHICKEN | PORK | BEEF | TUNA | MACKEREL | BEER |
|---------|---------|------|------|------|----------|------|
| CHICKEN | 1       | 0.5  | 0.5  | 0    | 0        | 0    |
| PORK    | 0.5     | 1    | 0.5  | 0    | 0        | 0    |
| BEEF    | 0.5     | 0.5  | 1    | 0    | 0        | 0    |
| TUNA    | 0       | 0    | 0    | 1    | 0.5      | 0    |
| MACKEREL| 0       | 0    | 0    | 0.5  | 1        | 0    |
| BEER    | 0       | 0    | 0    | 0    | 0        | 1    |

FIG.6

| CANDIDATE PATTERN HAVING LENGTH OF ONE | FREQUENCY | SUPPORT |
|---|---|---|
| CHICKEN | 4 | 80% |
| PORK | 2 | 40% |
| BEEF | 1 | 20% |
| TUNA | 3 | 60% |
| MACKEREL | 3 | 60% |
| BEER | 3 | 60% |

FIG.10

| CANDIDATE PATTERN HAVING LENGTH OF TWO | FREQUENCY | ASSOCIATION SUPPORT |
|---|---|---|
| CHICKEN, PORK | 2 | 20% |
| CHICKEN, TUNA | 3 | 60% |
| CHICKEN, MACKEREL | 2 | 40% |
| CHICKEN, BEER | 3 | 60% |
| PORK, TUNA | 1 | 20% |
| PORK, MACKEREL | 0 | 0% |
| PORK, BEER | 2 | 40% |
| TUNA, MACKEREL | 2 | 20% |
| TUNA, BEER | 2 | 40% |
| MACKEREL, BEER | 1 | 20% |

FIG.12

| CANDIDATE PATTERN HAVING LENGTH OF THREE | FREQUENCY | ASSOCIATION SUPPORT |
|---|---|---|
| CHICKEN, TUNA, MACKEREL | 2 | 20% |
| CHICKEN, TUNA, BEER | 2 | 40% |
| CHICKEN, MACKEREL, BEER | 1 | 20% |

PATTERN EXTRACTING APPARATUS AND METHOD

TECHNICAL FIELD

Embodiments of the present invention relate to control of extracting the patterns of combination of items from target information pieces including a plurality of items.

BACKGROUND ART

Apparatuses and methods have conventionally been studied for efficiently extracting, from target information pieces including a plurality of items, a particular pattern or a combination of items suited for the purpose of analysis and the like in order to analyze various activities or events.

PRIOR ART DOCUMENT

Patent Document

[Patent Document 1] Japanese Patent Laid-Open No. 2003-76937

DISCLOSURE OF THE INVENTION

Problems to be Solved by the Invention

It is an object of the present invention to provide a pattern extracting apparatus and a pattern extracting method of extracting a particular pattern from a plurality of target information pieces including items in view of the association between items.

Means for Solving the Problems

According to an embodiment, a pattern extracting apparatus extracting, from a plurality of items included in target information pieces, a pattern of a combination of two or more of the items different from each other, includes a first storing section storing a plurality of target information pieces, a candidate pattern producing section producing candidate patterns each formed of two or more of the items different from each other based on each of the items included in each of the plurality of target information pieces, a candidate evaluation value calculating section calculating an extraction evaluation value of the candidate pattern based on a frequency of appearance at which the produced candidate pattern appears in each of the plurality of target information pieces, and a pattern extracting section determining any of the candidate patterns having the calculated extraction evaluation value satisfying a predetermined threshold value and extracting the candidate pattern satisfying the threshold value, and further includes a second storing section storing an association degree between the items. The candidate evaluation value calculating section identifies the association degree between the items included in the candidate pattern and calculates the extraction evaluation' value based on a weight based on the identified association degree and the frequency of appearance.

BRIEF DESCRIPTION OF THE DRAWINGS

FIG. 2 A diagram showing an exemplary transaction group serving as target information pieces stored in a data storing section.

FIG. 3 A diagram showing an exemplary association degree matrix table stored in an inter-item information storing section.

FIG. 6 A diagram showing an example of the frequencies and the supports of candidate patterns having a length of 1.

FIG. 10 A diagram showing an example of the frequencies and the association supports of candidate patterns having a length of 2.

FIG. 12 A diagram showing an example of the frequencies and the association supports of candidate patterns having a length of 3.

MODE FOR CARRYING OUT THE INVENTION

Embodiments will hereinafter be described with reference to the drawings.

A pattern extracting apparatus according to the embodiment performs control, when a plurality of target information pieces each including a plurality of items (information elements) are provided, such that the relationship found between items is used to extract a characteristic combination of items (pattern) from the plurality of target information pieces.

The term "pattern" typically refers to a combination of two or more items. In the following description, however, the term "pattern" may be used to represent a single item. In a narrow sense, the term "pattern" refers to a pattern having a "characteristic combination of items" as described above. A pattern serving as a candidate for extracting the pattern in the narrow sense is referred to as a "candidate for pattern" or a "candidate pattern."

The apparatus can be used, for example in the fields of finding a characteristic combination of purchased commodities in sale of daily necessities as in supermarkets, finding a characteristic cause-and-effect relationship between the characteristics of a branch office and the type of a paperwork mistake in banking, and finding the preference of an audience from the relationship between the characteristics of the audience and the viewing history in program recommendation. However, they are merely illustrative, and the present invention is not limited thereto.

The following description is made in conjunction with the case where the apparatus uses, as the items, commodities in sales business of daily necessities (foods) as in supermarkets. Specifically, description is made of the case where the apparatus extracts and finds a characteristic combination of commodities (foods) (that is, the "pattern") purchased by a purchaser in a floor for selling foods in a supermarket by using a single receipt given to the commodity purchaser as a single target information piece (transaction) and treating the commodities (the product names of the foods and the like) written on the receipt as the items.

Figure 1:
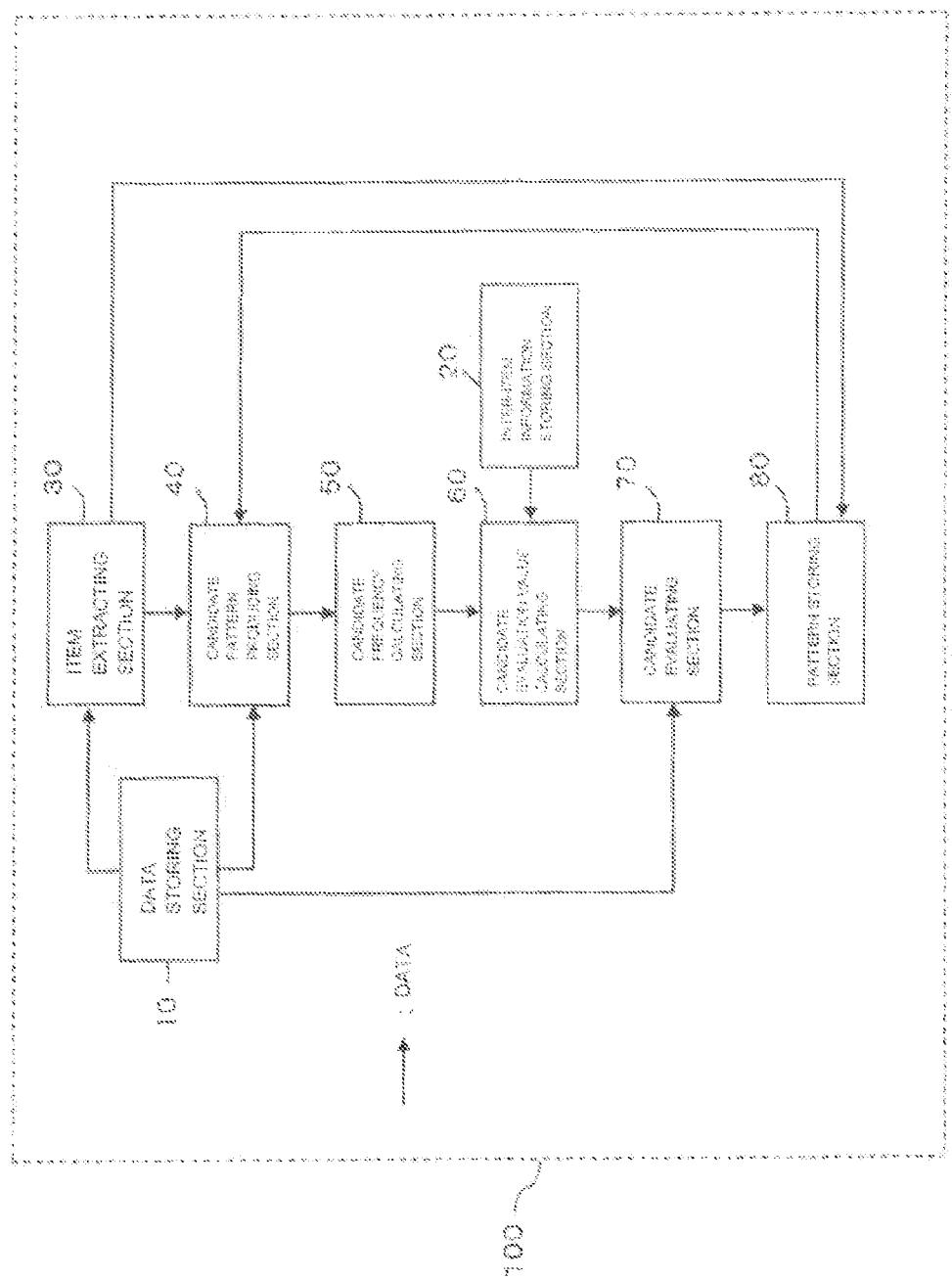
FIG. 1 A diagram showing an exemplary configuration of a pattern extracting apparatus according to a first embodiment as a block diagram showing the relationship between components constituting the apparatus.

FIG. 1 to FIG. 13 are diagrams illustrating a first embodiment. FIG. 1 is a block diagram of a pattern extracting apparatus 100 according to the present embodiment. In FIG. 1, each arrow connecting blocks indicates the direction of data flow. The apparatus includes a data storing section 10 serving as a first storing section which stores a set of transactions as a plurality of target information pieces, an inter-item information storing section 20 serving as a second storing section which stores information about the association between items, an item extracting section 30 which extracts items from the set of transactions, a candidate pattern producing section 40 which uses the extracted items to produce a candidate for pattern (candidate pattern) formed of two or more items different from each other, a candidate frequency calculating section 50 which calculates the frequency at which the candidate pattern appears in the transactions, a candidate evaluation value calculating section 60 which uses the frequency of the candidate pattern and the information about the association between items to calculate an extraction evaluation value for the candidate pattern, and a candidate evaluating section 70 which extracts, as a pattern, the candidate pattern having the extraction evaluation value calculated satisfies a reference value, and a pattern storing section 80.

The present apparatus can be realized by storing the data of a program for executing processing, later described, in an external storage medium such as a hard disk apparatus, not shown, and reading the program into a personal computer (PC). In this case, a storage device such as the hard disk apparatus and a RAM in the computer can function as the data storing section 10, the inter-item information storing section 20, and the pattern storing section 80, and a control device such as a CPU can function as the item extracting section 30, the candidate pattern producing section 40, the candidate frequency calculating section 50, the candidate evaluation value calculating section 60, and the candidate evaluating section 70.

The data storing section 10 functions as a transaction storing section which stores the data of the set of transactions (hereinafter also referred to as a "transaction group") serving as the target information prior to a series of processing operations, later described, and stores data about a minimum support and data indicating priorities for arranging items, later described.

FIG. 2 shows an example of the transaction group serving as the target information stored in the data storing section 10. The transaction is formed of one or more of a plurality of items (in this example, six items or six types of items including "CHICKEN," "PORK," "BEEF," "TUNA," "MACKEREL," and "BEER" which are purchased commodities). FIG. 2 shows the case where five transactions including A01, A02, A03, A04, and A05 are stored as the transaction group in a predetermined storage area of the data storing section 10.

For the sales business of daily necessities as in supermarkets, a single receipt on which purchased commodities are listed corresponds to a single transaction (for example, A01). In this example, however, attention is paid not to the prices of the commodities or the number of the purchased commodities written on the receipt but only to the information about the fact that the commodities were purchased. As illustrated in FIG. 2, the data storing section 10 stores the data of the transactions in which only the information of the product names is included as the items, and even when two or more commodities of the same type are purchased, only one product name thereof exists.

In the present embodiment, the transaction group stored in the data storing section 10 has a data structure in which each of the transaction numbers (A01 to A05) for identifying the respective transactions is assigned an item list (purchase list in this example) representing a list of items constituting the transaction. Each of the transactions from A01 to A05 is formed of a single or a plurality of types of items shown in the purchase list. Specifically, the transaction A01 consists of four items (in other words, four types of commodities, and this applies to the following), the transaction A02 consists of three items, the transaction A03 consists of four items, the transaction A04 consists of two items, and the transaction A05 consists of three items. In each of the transactions, the items are separated by a predetermined mark such as a comma for identification. Although description is herein made of the case where each of the transactions constituting the transaction group consists of a plurality of items for clear understanding, any transaction including one or more items is feasible.

The data about the minimum support stored in the data storing section 10 is numeric value data preset by an analyzer or the like. In the present embodiment, such a numeric value is a reference value (threshold value) for extracting frequent items, later described, and is also used as a reference value (threshold value) for extracting a characteristic pattern from candidate patterns formed of a plurality of items. The numeric value data of the minimum support can be arbitrarily set or changed through the operation of an operation input section such as a mouse or a keyboard, not shown, prior to processing, in accordance with the number of transactions constituting the transaction group used or the components of items.

Although the following description is made of the case where the numeric value of the minimum support is set to 40%, the value is not restrictive. Although the following description is made of the case where the numeric value of the minimum support is preset to 40% for all patterns, a different numeric value may be preset for each order or length of a pattern (that is, the number of items constituting the pattern).

The data indicating the priorities for arranging items stored in the data storing section 10 is referenced in producing the candidate pattern, later described, and includes the "CHICKEN," "PORK," "BEEF," "TUNA," "MACKEREL," and "BEER" in decreasing order of priority in this example. The data can also be arbitrarily set or changed through the operation of the operation input section such as the mouse or the keyboard, not shown, prior to the processing. The priority in the present embodiment is information which defines the order for arranging the plurality of items constituting the pattern, and for example, is provided for arranging the plurality of items based on a certain rule such as the order of article categories, the order of articles in categories, a dictionary, and an alphabetical order. The use of the priority allows the smooth and fast processing of producing the candidate pattern, for example.

The inter-item information storing section 20 stores the data of the information about the association between items constituting the transaction group used (hereinafter also referred to as "inter-item knowledge") prior to the series of processing operations, later described. The data of the inter-item knowledge is the data of association degree between items (including association degree between the same items), more particularly, the numeric value data indicating the level of association degree. In the present embodiment, the data has a higher numeric value as the association degree between items is higher.

FIG. 3 shows an example of the inter-item knowledge stored in the inter-item information storing section 20. In this example, the inter-item knowledge is shown in a data table in which the items existing in the transaction group are arranged in matrix form. The inter-item knowledge is a numeric value within a range from 0 to 1 to indicate the level of relationship between one item and another item. In the following, the numeric value is referred to as the "association degree." The association degree is defined to have a higher value as the relationship between items is closer (the association degree is higher) and to have a lower value as the relationship is more distant (the association degree is lower). The association degree between the same items is given the highest value or 1. A specific numeric value of the association degree can be arbitrarily set or changed by the analyzer or the like through the operation of the operation input section such as the mouse or the keyboard, not shown, prior to the processing, in accordance with the number or the structure of categories serving as a superordinate of the item in the transaction to be processed.

The inter-item knowledge stored in the inter-item information storing section 20 in the example of FIG. 3 is provided by using an association degree matrix table in which n items existing in the transaction group are arranged in row (i) and column (j) directions and the relationship between two items is represented as a numeric value in the matrix form (this matrix is hereinafter also referred to as a "association degree matrix") to register the value of the association degree between items. In the association degree matrix table, up to 1 used as the maximum value, a higher value is registered as the association degree between items is higher. Specifically, the maximum value or 1 is registered between the same items (for example, "CHICKEN" and "CHICKEN," and "PORK" and "PORK"), and a value according to the level of the relationship between items is registered between different items (for example, "CHICKEN" and "PORK," and "CHICKEN" and "BEER"). In this example, when the items belong to the same category, that is, when the items are included in meat ("CHICKEN" and "PORK," "CHICKEN" and "BEEF," and "PORK" and "BEEF") or when the items are included in fish ("TUNA" and "MACKEREL"), the association degree is regarded as being intermediate and a value of 0.5 is registered. In contrast, a value of 0 is registered when the items belong to different categories, that is, between an item belonging to the meat category, an item belonging to the fish category, and the BEER which is an item belonging to a beverage category, since they are regarded as having no association.

In the present embodiment, the "inter-item knowledge" can be translated into the value of the association between items which are not wished to be extracted as a pattern (combination). Specifically, the maximum value (1 in this example) is set for the combination of the same items (for example, "CHICKEN" and "CHICKEN," and "PORK" and "PORK") to avoid extraction as a pattern in analysis, the lower value (0.5 in this example) is set for the combination of the items belonging to the same category (for example, "CHICKEN" and "PORK") to avoid easy extraction as a pattern in analysis, and the minimum value (0 in this example) is set for the combination of the items belonging to largely different categories (for example, "CHICKEN" and "BEER") to promote extraction as a pattern in analysis.

The item extracting section 30 performs the processing of reading the data of the transaction group stored in the data storing section 10 and extracting frequent items from the read data. Specifically, the item extracting section 30 extracts the items constituting each of the transactions from the data storing section 10 and calculating, for each of the extracted items, the frequency of appearance or the number of transactions in which the item appears (hereinafter also referred to as the "item frequency"). The information of the calculated item frequency is passed to the candidate pattern producing section 40 from the item extracting section 30. In addition, the item extracting section 30 calculates the supports of the items based on the calculated item frequencies, selects the items having the calculated supports equal to or higher than the minimum support (40% in this example) preset in the data storing section 10 described above, and stores only those items as the frequent items in the pattern storing section 80.

The calculation of the support of a given item (it) is specifically made with the following expression 1.

[Expression 1]

$$\text{support(it)} = \frac{\text{number of transactions including item it}}{\text{total number of transactions}} \times 100 \quad \text{(expression 1)}$$

The candidate pattern producing section 40 produces candidates for pattern each formed of a set of items with reference to the transaction group. Specifically, the candidate pattern producing section 40 reads the patterns having a length of m stored in the pattern storing section 80 described later (the frequent items described above with m equal to 1, or patterns of a higher order with m equal to or larger than 2 described later), and produces candidates for pattern (candidate patterns) having a length of m+1 satisfying a predetermined condition from the frequent items or the patterns with reference to the transaction group in the data storing section 10. The candidate patterns produced by the candidate pattern producing section 40 include second order patterns (see FIG. 10) each having two frequent items and third or higher order patterns (see FIG. 12) each provided by adding, to a pattern having a length of 2 or more (see FIG. 11), an item in those patterns that satisfies a predetermined condition. The details of the predetermined condition and the processing performed by the candidate pattern producing section 40 are described later.

The higher order patterns in the pattern storing section 80 are extracted and stored from the patterns having a length of 2 or more (second or higher order patterns) appearing in a plurality of transactions in the transaction group since those patterns are regarded as having a characteristic combination of items. The details of the processing of the extraction and the storage are described later.

The candidate frequency calculating section 50 calculates, for each of the candidate patterns produced by the candidate pattern producing section 40, the frequency of appearance (the number of transactions) at which the candidate pattern appears in the transaction group, and passes the calculated value of the frequency for each of the candidate patterns to the candidate evaluation value calculating section 60.

The candidate evaluation value calculating section 60 uses the value of the frequency of appearance for each of the candidate patterns passed from the candidate frequency calculating section 50 and the inter-item knowledge (association degree matrix table) described above to calculate an evaluation value (extraction evaluation value) as the evaluation value for the candidate pattern in view of the association between items such that the evaluation value monotonously decreases as the number of items constituting that pattern increases. In the following, the evaluation value is referred to as an "association support." The candidate evaluation value calculating section 60 calculates the association support for each of the candidate patterns and passes the calculated value of the association support to the candidate evaluating section 70.

The candidate evaluating section 70 determines whether or not the value of the association support passed from the candidate evaluation value calculating section 60 satisfies a predetermined reference value for each of the candidate patterns, and stores the data of the candidate pattern determined to satisfy the reference value in the pattern storing section 80. In the present embodiment, the candidate evaluating section 70 performs the processing of referencing the minimum support in the data storing section 10 to determine whether or not the value of the association support of the candidate pattern is equal to or higher than the minimum support (40% in this example) and storing the data of the candidate pattern having the value equal to or higher than the minimum support in the pattern storing section 80. With the processing, any of the candidate patterns that have a "pattern" or a characteristic combination of items are extracted and stored in the storage area of the pattern storing section 80.

When the data of the frequent items or the data of the patterns is stored by the item extracting section 30 or the candidate evaluating section 70, the pattern storing section 80 notifies the candidate pattern producing section 40 of the storage of the data and supplies the stored data of the patterns to the candidate pattern producing section 40. The data of the frequent items or the data of the patterns stored in the pattern storing section 80 can be appropriately displayed on a display section such as an LCD, not shown, or printed out by a printer, not shown, automatically in response to the storage or by a user operating the operation input section.

The detailed processing operations of the pattern extracting apparatus 100 will hereinafter be described with reference to flow charts.

Figure 4:
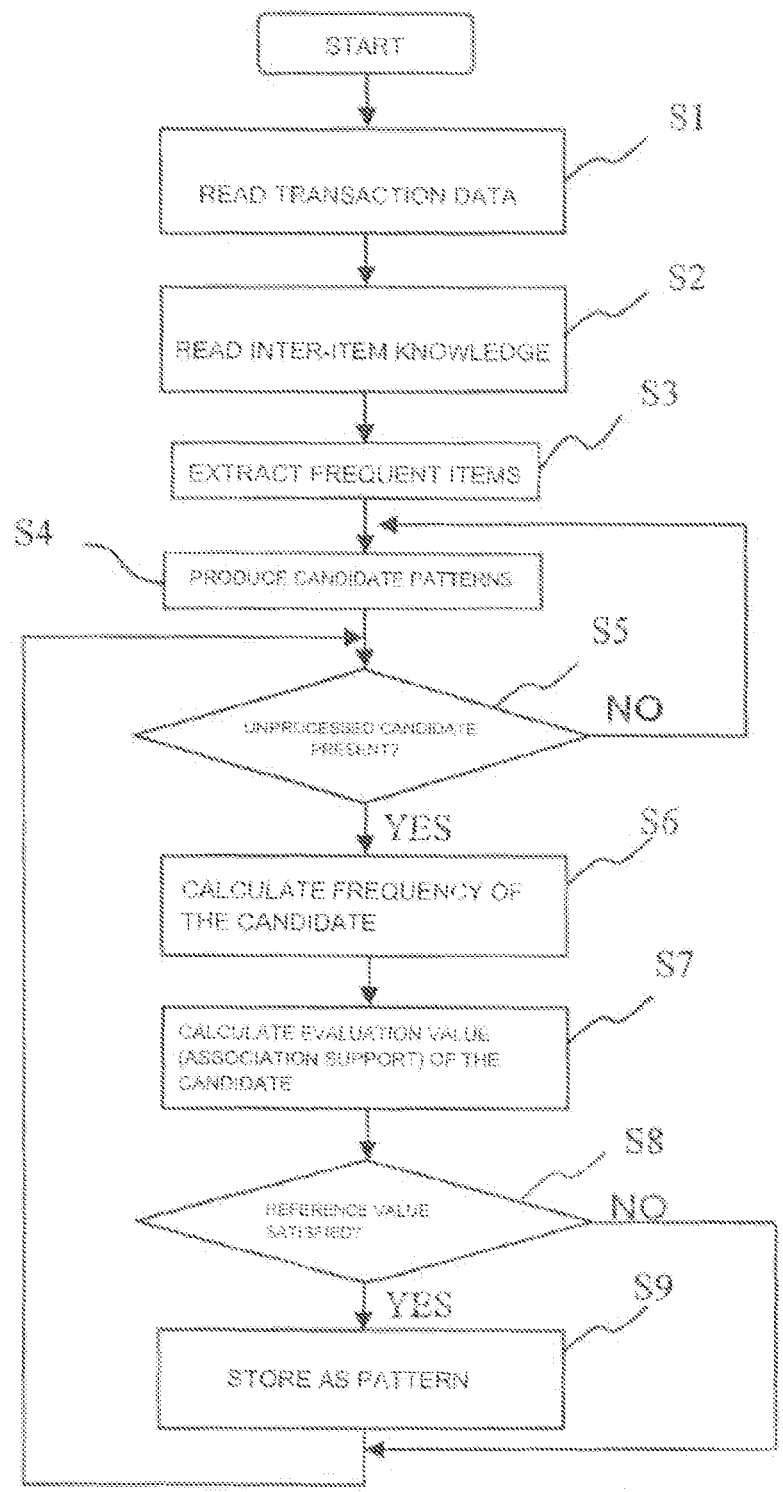
FIG. 4 A flow chart for explaining the operation of the pattern extracting apparatus.

The pattern extracting apparatus 100 of the present embodiment starts the processing at step S1 of the flow chart in FIG. 4. At step S1, the item extracting section 30 reads the transaction group stored in the data storing section 10. Such processing allows the data of the items constituting the transactions described above to be read to the work area (RAM) of the CPU for each of the transaction numbers. In the example of FIG. 2, the data of "CHICKEN," "TUNA," "MACKEREL," and "BEER" is read as the items of the transaction A01, the data of "CHICKEN," "PORK," and "BEER" is read as the items of the transaction A02, the data of "CHICKEN," "PORK," "TUNA," and "BEER" is read as the items of the transaction A03, the data of "BEEF" and "MACKEREL" is read as the items of the transaction A04, and the data of "CHICKEN," "TUNA," and "MACKEREL" is read as the items of the transaction A05, respectively.

At step S2, the candidate evaluation value calculating section 60 reads the inter-item knowledge stored in the inter-item information storing section 20. Such processing allows the numeric value data between items registered in the association degree matrix table described in FIG. 3 to be read to the work area (RAM) of the CPU. The read numeric value data is used in the processing of calculating the extraction evaluation value, later described.

Figure 5:
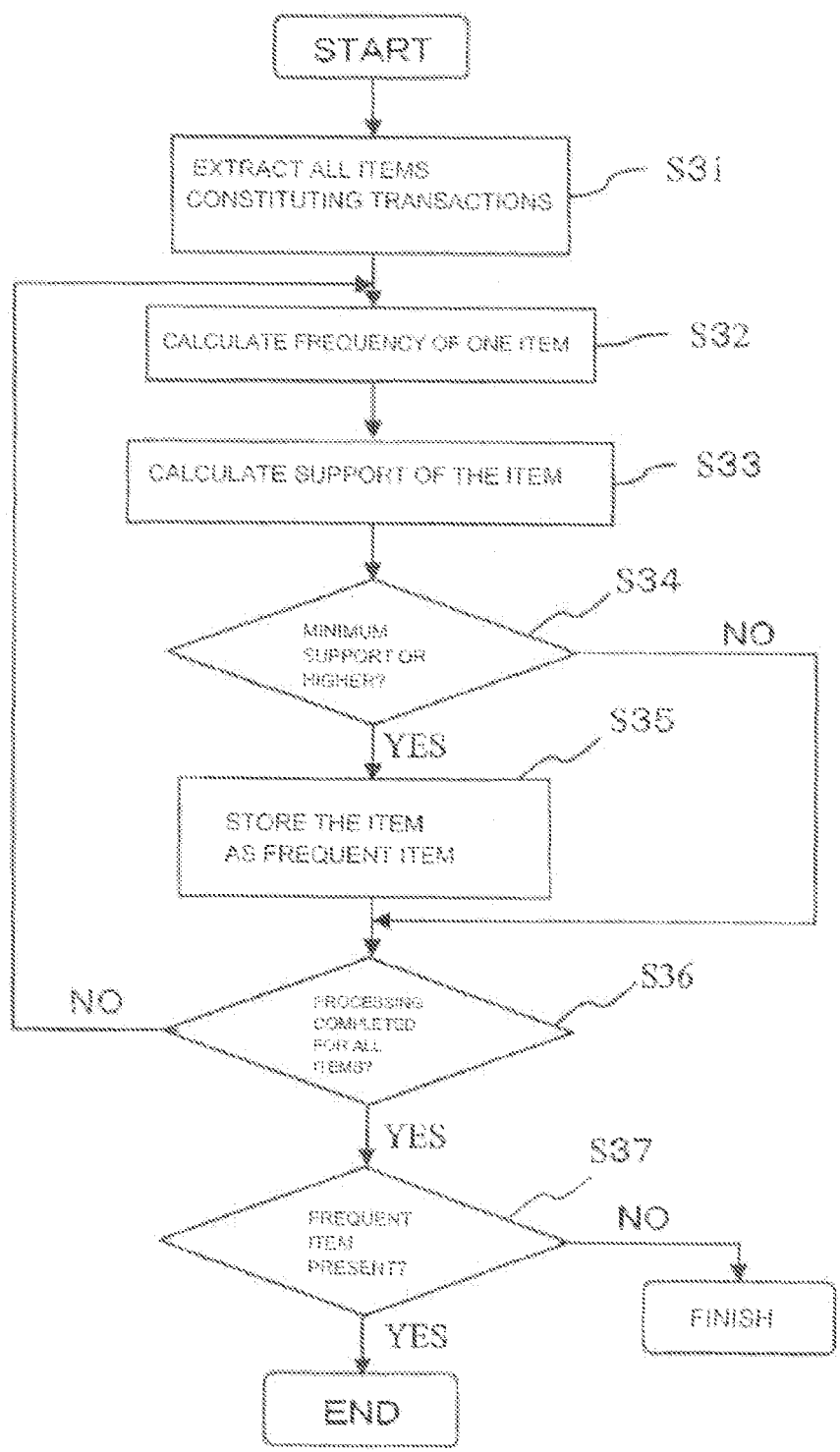
FIG. 5 A subroutine for explaining the processing performed by an item extracting section.

Subsequently, at step S3, the item extracting section 30 performs the processing of extracting and storing the items having a high frequency of appearance (frequent items) in accordance with a subroutine shown in FIG. 5. First, the item extracting section 30 searches the set of transactions read at step S2 to extract all the types of items constituting the transactions (step S31). For example, in the set of transactions in FIG. 2, the item extracting section 30 extracts the six types of items including "CHICKEN," "PORK," "BEEF," "TUNA," "MACKEREL," and "BEER." In the present embodiment, the extracted items are treated as candidate items, that is, as candidate patterns of a first order (having a length of 1) which can be candidates for the characteristic pattern (see FIG. 6).

Next, the item extracting section 30 performs the processing from step S32 to S35 for each of the extracted items. First, for one of the extracted items, the item extracting section 30 calculates the number of transactions as item frequency in which that item appears with reference to the transaction group read at step S2 (step S32). For example, in the transaction group of FIG. 2, the item "CHICKEN" is included in the transactions A01, A02, A03, and A05, and the frequency of "CHICKEN" is calculated at "4."

Next, the item extracting section 30 calculates the support of the item based on the calculated frequency of the item with the expression 1 described above (step S33), and determines whether or not the calculated value is equal to or higher than the minimum support preset in the data storing section 10 (step S34). For example, in the item "CHICKEN" for which the frequency is calculated at 4, the total number of transactions is 5 and thus the support is 80% (⅘×100).

When the calculated support of the item is equal to or higher than the minimum support (40% in this example) stored in the data storing section 10, the item extracting section 30 stores that item as the frequent item in the pattern storing section 80 at step S35 and proceeds to step S36. In contrast, when the calculated support of the item is less than the minimum support (40% in this example), the item extracting section 30 does not store that item in the pattern storing section 80 and excludes that item from possible items forming a pattern (discards the data of that item) and proceeds to step S36. At step S36, the item extracting section 30 determines whether or not the processing is completed for all the items extracted at step S31, and returns to step S32 and repeats the processing from step S32 to step S35 described above when the processing is not completed, or proceeds to step S37 when the processing is completed for all the items.

Figure 7:
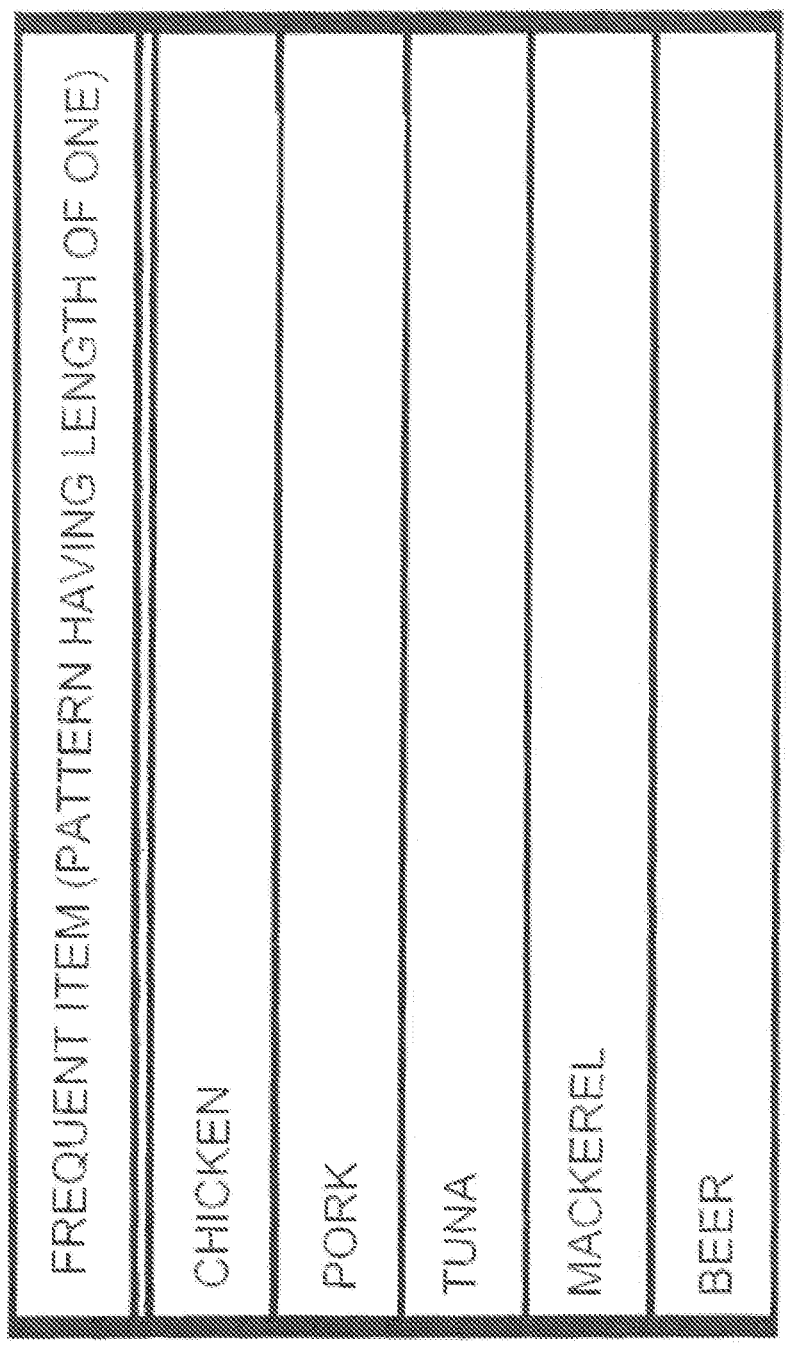
FIG. 7 A diagram showing exemplary patterns having a length of 1 stored in a pattern storing section.

Since the item "CHICKEN" has the support calculated at 80% which is higher than the minimum support (40%) (YES at step S34), the item is stored as the frequent item in the pattern storing section 80. Similarly, for the other items "PORK," "BEEF," "TUNA," "MACKEREL," and "BEER," the item extracting section 30 calculates the frequencies thereof at "2," "1," "3," "3," and "3," respectively (step S32), and calculates the supports thereof at "40%," "20%," "60%," "60%," and "60°," respectively (step S33). In this manner, the frequency and the support are calculated for each of the items as the candidate patterns having a length of 1 as shown in FIG. 6. Since the minimum support is set to 40% in this example, only the item "BEEF" having the support less than the minimum support is excluded from the possible items forming a pattern (NO at step S34.). As shown in FIG. 7, the items "CHICKEN," "PORK,"

"TUNA," "MACKEREL," and "BEER" excluding "BEEF" are stored as the frequent items in the pattern storing section 80.

For the processing of producing candidate patterns having a length of 2 or more described later, the frequent items stored in the pattern storing section 80 are arranged in the preset order by the item extracting section 30 referencing the data indicating the priorities for arranging items described above in the data storing section 10. In the present embodiment, as shown in FIG. 6, the patterns are arranged in the order of priority, "CHICKEN," "PORK," "TUNA," "MACKEREL," and then "BEER." As described above, with the series of processing operations at step S3 (from step S31 to step S36), the item having a support less than the minimum support ("BEEF" in this example) is excluded from the candidates for pattern and is not selected as an element of higher order candidate patterns, so that the load on computer processing is significantly reduced to shorten the time taken to perform the extraction of the higher order patterns. It should be noted that, in the present embodiment, the frequent item is regarded as a "pattern" (that is, a characteristic combination) in which the number of item constituting the pattern (the length of the pattern) is 1.

A step S37, the item extracting section 30 determines whether or not any frequent item exists with reference to the pattern storing section 80. When it is determined that any frequent item exists, the item extracting section 30 proceeds step S4 since it is determined that the frequent item is extracted successfully. When it is determined that no frequent item exists, the item extracting section 30 finishes the processing in the apparatus since it is determined that the frequent item is extracted unsuccessfully. In other words, when not a single frequent item is extracted in the processing at step S3, the processing in the apparatus is finished.

Figure 8:
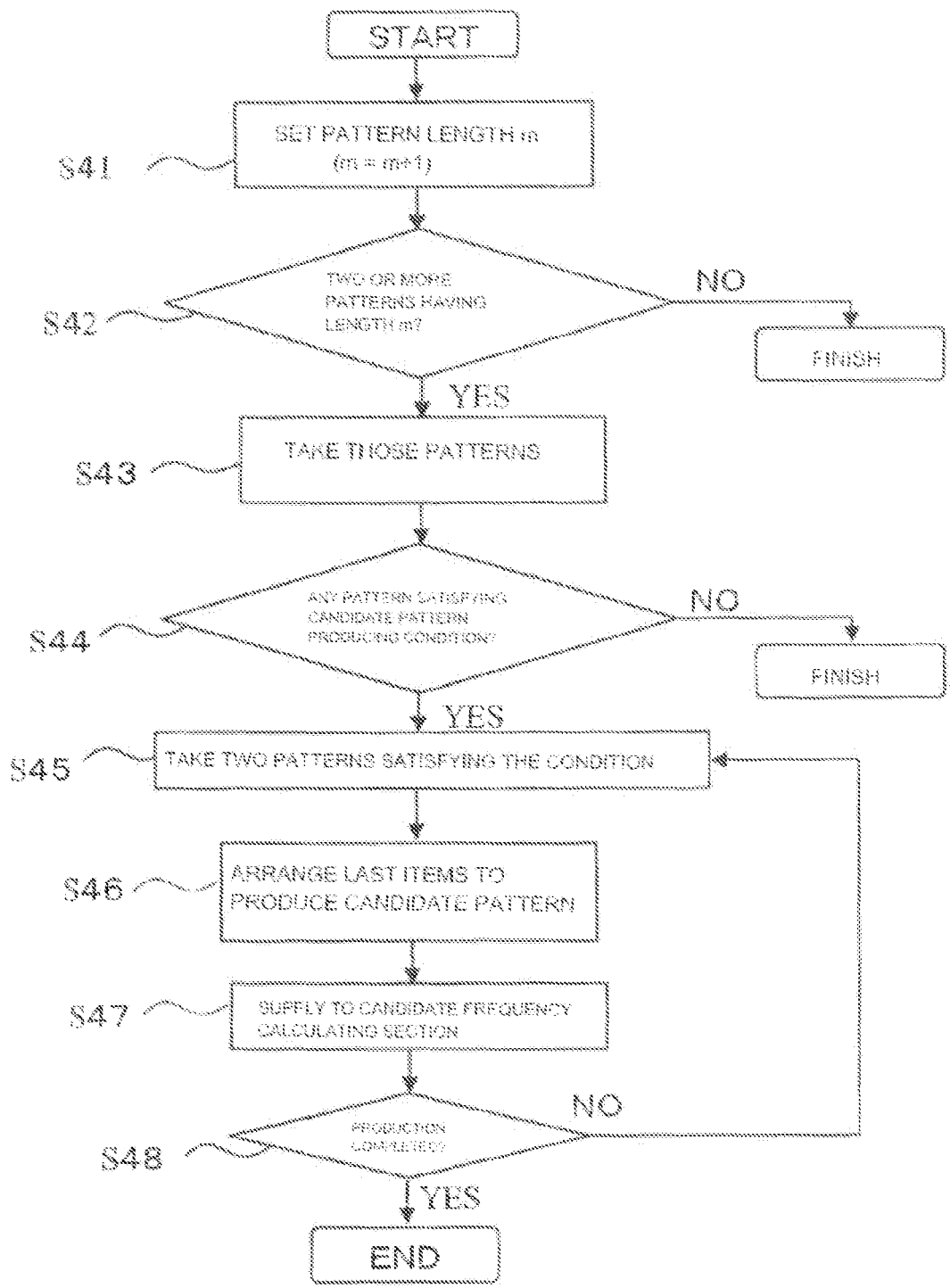
FIG. 8 A subroutine for explaining the processing performed by a candidate pattern producing section.

At step S4, the candidate pattern producing section 40 performs the processing of producing candidates for pattern in accordance with a subroutine in FIG. 8. First, the candidate pattern producing section 40 sets the length (the value of m) of a pattern taken out of the pattern storing section 80 at step S41. Specifically, the candidate pattern producing section 40 sets the value of the length m of the pattern to 1 (m=1) when step S41 is performed for the first time, or adds 1 to the value of the length m of the pattern (m=m+1) when step S41 is performed for the second and subsequent times.

Next, the candidate pattern producing section 40 determines whether or not two or more patterns have the length m set at the preceding step among the patterns stored in the pattern storing section 80 (the frequent item having a length of 1 or the pattern having a length of 2 or more) (step S42). When the result is NO or it is determined that no or one such pattern exists, the candidate pattern producing section 40 finishes the processing since it is determined that no candidate pattern can be produced. When the result is YES or it is determined that two or more such patterns exist, the candidate pattern producing section 40 takes out all those patterns (step S43) and proceeds to step S44. At step S44, the candidate pattern producing section 40 determines whether or not two patterns satisfy a candidate pattern producing condition among all the taken patterns. When it is determined that no such patterns exist, the processing is finished since it is determined that no candidate pattern can be produced. When it is determined that such patterns exist, the candidate pattern producing section 40 proceeds to step S45.

In the present embodiment, the candidate pattern producing condition set at step S44 is specified such that "the pattern should include the same item from the first to (m−1)th and a different item at the last." As a precondition, however, the items in each of the patterns need to be arranged in accordance with the preset order. As described above, the priorities are given in the order of "CHICKEN," "PORK," "BEEF," "TUNA," "MACKEREL," and then "BEER" in this example, and the patterns are arranged in accordance with the order of priority.

The candidate pattern producing section 40 performs the processing of taking the two patterns satisfying the candidate pattern producing condition at step S44 (step S45), and arranging the different items to produce a candidate for pattern (candidate pattern) having a length larger than the pattern length m set at step S41 by one (step S46).

Specifically, at step S46, the candidate pattern producing section 40 produces a single candidate pattern having a length of m+1 (m−1+2) in which the m−1 items common to the taken two patterns are followed by the last two different items arranged in accordance with the item order. Then, the candidate pattern producing section 40 supplies the produced candidate pattern to the candidate frequency calculating section 50 (step S47). The candidate pattern producing section 40 repeats the processing from step S45 to step S48 until all the candidate patterns having the length m+1 are produced, and finishes the processing on step S4 when it is determined that all such patterns are produced. Thus, the repeated extraction of patterns and production of pattern candidates produce all the candidates for pattern having the pattern length m+1 from the frequent items or the patterns having the length m stored in the pattern storing section 80.

Next, the processing of producing the candidate pattern is described in detail with reference to a specific example.

For example, it is assumed that the pattern length m is set to 1 at step S41 and that the patterns having the length of 1 (that is, the frequent items) shown in FIG. 7 are stored in the pattern storing section 80. Since the items are given the priorities in the order of "CHICKEN," "PORK," "BEEF," "TUNA," "MACKEREL," and then "BEER" as descried above, the frequent items stored in the pattern storing section 80 are arranged in the order of "CHICKEN," "PORK," "TUNA," "MACKEREL," and then "BEER" excluding "BEEF."

Since each of the patterns in FIG. 7 has the length m of 1, all of them are taken out at step S43 after step S42. For the candidate pattern producing condition at step S44, the pattern length m of 1 means that not a single item (that is, no item) is common, so that "the pattern includes the same item from the first to (m−1)th" and "the pattern includes a different item at the last," and thus a combination of arbitrary two patterns in FIG. 7 satisfies the condition. The candidate pattern producing section 40 takes out two patterns in the order of "CHICKEN, PORK," "CHICKEN, TUNA," "CHICKEN, MACKEREL," "CHICKEN, BEER," "PORK, TUNA," "PORK, MACKEREL," "PORK, BEER," "TUNA, MACKEREL," "TUNA, BEER," and "MACKEREL, BEER" in accordance with the priorities of items described above (step S45), and produces ten candidates for pattern having a length of 2 (second order candidate patterns) at step S46 (see FIG. 10). The information of the produced ten candidate patterns is supplied to the candidate frequency calculating section 50, and the processing from step S5 to step S9 described later is performed for each of the candidate patterns. When the processing is performed for all the ten candidate patterns, the processing is returned to step S5 from step S9.

At step S5, the candidate frequency calculating section 50 determines whether or not any of the candidate patterns supplied from the candidate pattern producing section 40 is not subjected to the processing of frequency calculation yet.

When any of them is unprocessed, the candidate frequency calculating section 50 takes out such a candidate pattern and proceeds to step S6. When all the candidate patterns are subjected to the frequency calculation processing, the processing of the apparatus returns to step S4 for the candidate pattern production.

The following processing from step S6 to step S10 is performed for the one candidate pattern taken out. First, at step S6, the candidate frequency calculating section 50 references the set of transactions read at step S1 to calculate the frequency of appearance of that candidate for pattern taken out, that is, the number of transactions including that candidate pattern.

For example, when the set of transactions shown in FIG. 2 is read at step S1, a pattern length of 2 is set at step S4, and the candidate for pattern "CHICKEN, PORK" is taken out at step S6, then the frequency of appearance of that candidate for pattern is calculated at 2 since it is included in the transactions A02 and A03 (see FIG. 10). Similarly, for the other candidate patterns "CHICKEN, TUNA," "CHICKEN, MACKEREL," "CHICKEN, BEER," "PORK, TUNA," "PORK, MACKEREL," "PORK, BEER," "TUNA, MACKEREL," "TUNA, BEER," and "MACKEREL, BEER," their frequencies of appearance are calculated at 3, 2, 3, 1, 0, 2, 2, 2, and 1.

At step S7, the candidate evaluation value calculating section 60 uses the frequency of appearance of the candidate pattern calculated at step S6 and the inter-item knowledge (association degree matrix table) read at step S2 to evaluate the association between the items constituting the pattern to calculate the extraction evaluation value (hereinafter referred to as the association support) which is lower as the frequency is lower and as the pattern consists of items having a higher association.

Figure 9:
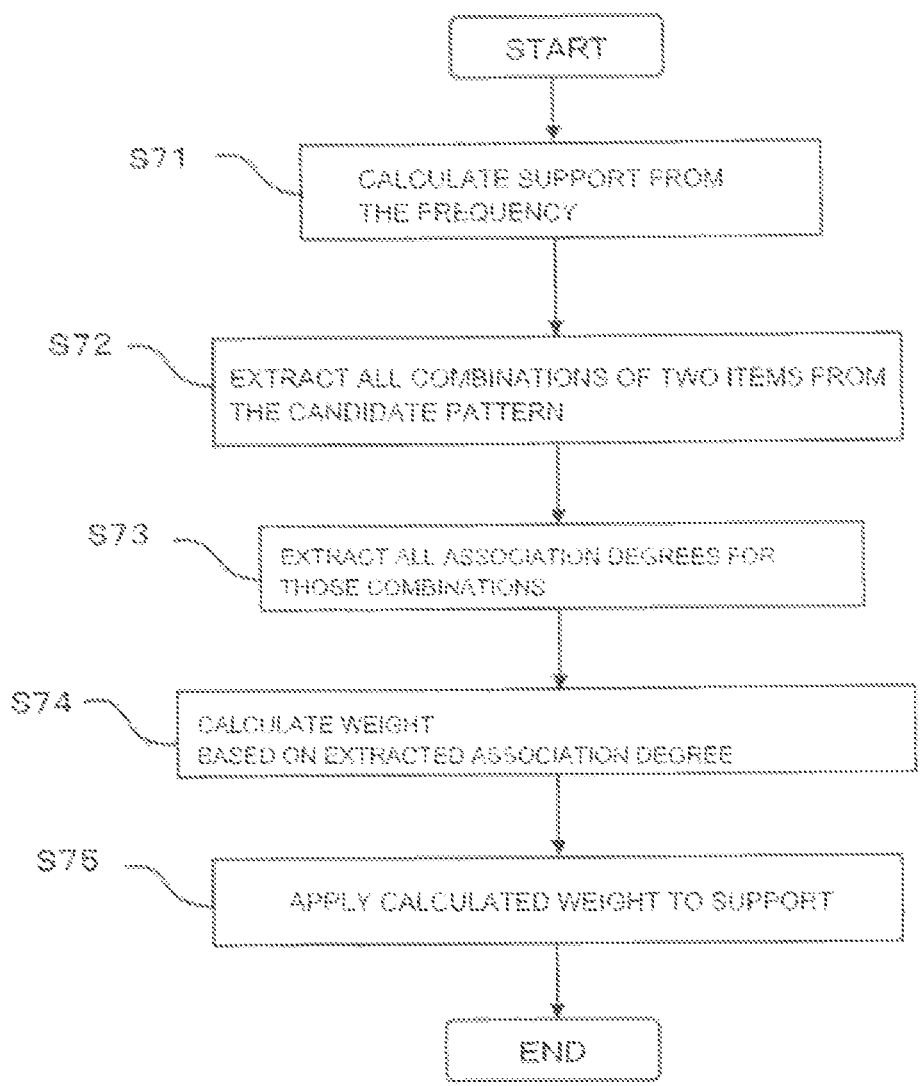
FIG. 9 A subroutine for explaining the processing performed by a candidate evaluation value calculating section.

Specifically, as shown in a flow chart of FIG. 9, the candidate evaluation value calculating section 60 calculates the support of the candidate pattern from the frequency of appearance calculated at step S6 (step S71). The calculation of the support of the candidate pattern may be made similarly to the calculation with the expression 1 described above except that "the number of transactions including the item" is replaced with "the number of transactions including the pattern." At step S72, the candidate evaluation value calculating section 60 extracts all the combinations of two items included in the candidate pattern. At step S73, the candidate evaluation value calculating section 60 references (identifies) the inter-item knowledge read from the inter-item information storing section 20 at step S2 to extract all the association degrees for the extracted combinations. Subsequently, the candidate evaluation value calculating section 60 calculates a weight based on the extracted association degrees (step S74) and applies the calculated weight to the support calculated at step S71 to calculate an extraction evaluation value (association support f(p)) for the candidate pattern (step S75).

The weight and the association support f(p) need to be defined to monotonously decrease as the pattern length m increases. More specifically, the association support f(p) needs to be defined such that, when the relationship p1 ⊆ p2 holds (p1 is a subset of p2) for two patterns or candidates for pattern p1 and p2, the relationship f(p1)≥f(p2) holds. In other words, the candidate evaluation value calculating section 60 needs to calculate the weight such that a trade-off is made between the weight and the pattern length m.

Various definitions and calculation expressions are contemplated for the weight and the association support. For example, the weight calculated by the candidate evaluation value calculating section 60 can be defined as a value obtained by subtracting the extracted association degree from a predetermined value (1, for example). Alternatively, the weight calculated by the candidate evaluation value calculating section 60 can be defined, for example, by maintaining the sum of the extracted association degree and the weight at a fixed value (1, for example) and calculating and setting a difference between the sum and the extracted association degree to the weight.

In the present embodiment, the weight and the association support calculated by the candidate evaluation value calculating section 60 are defined with the association support f(p) as shown in the following expression 2.

[Expression 2]

$$f(p) = \left[1 - \max_{it_i, it_j \in p, it_i \neq it_j} \{s(it_i, it_j)\}\right] \times \frac{\text{number of transactions including pattern } p}{\text{total number of transactions}} \times 100 \quad \text{(expression 2)}$$

In a first term of the expression 2, $s(it_i, it_j)$ represents the association degree between an item $it_i$ and an item $it_j$, and $\max\{s(it_i, it_j)\}$ represents the maximum value of the association degrees between all the items $(it_i, it_j)$ constituting the pattern.

In the first term representing the weight of the expression 2, the maximum value (max) of the association degrees between the items constituting the pattern is used and is subtracted from a constant 1. As the pattern length m increases, the maximum value of the association degrees between the items monotonously increases, and the maximum value is subtracted from the constant 1 to result in the value of the first term representing the weight which monotonously decreases. For the second term of the expression 2, the value of denominator (the total number of transactions) is a fixed value, whereas the value of numerator monotonously decreases as the pattern length m increases. Consequently, the association support f(p) calculated by multiplying the first term by the second term and further multiplying the result by the constant monotonously decreases as the pattern length m increases.

By way of example, for the case of "CHICKEN, PORK" having a pattern length m of 2, the association degree between "CHICKEN" and "PORK" is set to 0.5 as shown in FIG. 3. The value of the first term of the expression 2 representing the weight is calculated at 0.5 (1−0.5). The frequency of "CHICKEN, PORK" is calculated at 2 as described above. Then, the association support f(p) of "CHICKEN, PORK" is calculated at 20% (0.5×2/5×100). For the case of "CHICKEN, TUNA" having the same pattern length m of 2, the association degree between "CHICKEN" and "TUNA" is set to 0, and the value of the first term of the expression 2 is calculated at 1 (1−0). The candidate evaluation value calculating section 60 calculates the association support f(p) of "CHICKEN, TUNA" at 60% (1×3/5×100) at step S7 (step S75). Similarly, the association supports of the candidate patterns "CHICKEN, MACKEREL," "CHICKEN, BEER," "PORK, TUNA," "PORK, MACKEREL," "PORK, BEER," "TUNA, MACKEREL," "TUNA, BEER," and "MACKEREL, BEER" are calculated at 40%, 60%, 20%, 0%, 40%, 20%, 40%, and 20% as shown in the columns of the association support in FIG. 10.

At step S8, the candidate evaluating section 70 compares the value of the minimum support stored in the data storing section 10 with the calculated association support f(p) of the candidate pattern to determine whether or not the value of the association support f(p) satisfies the minimum support serving as the threshold value. When the association support f(p) of the candidate is equal to or higher than the minimum support (40% in this example), the candidate evaluating section 70 proceeds to the processing at step S9 to register that candidate pattern as a "pattern" or having a characteristic combination of items. When the association support is lower than the minimum support, the candidate evaluating section 70 returns to the processing at step S5 without registering that candidate in the pattern storing section 80 and performs processing for the next candidate pattern.

Figure 11:
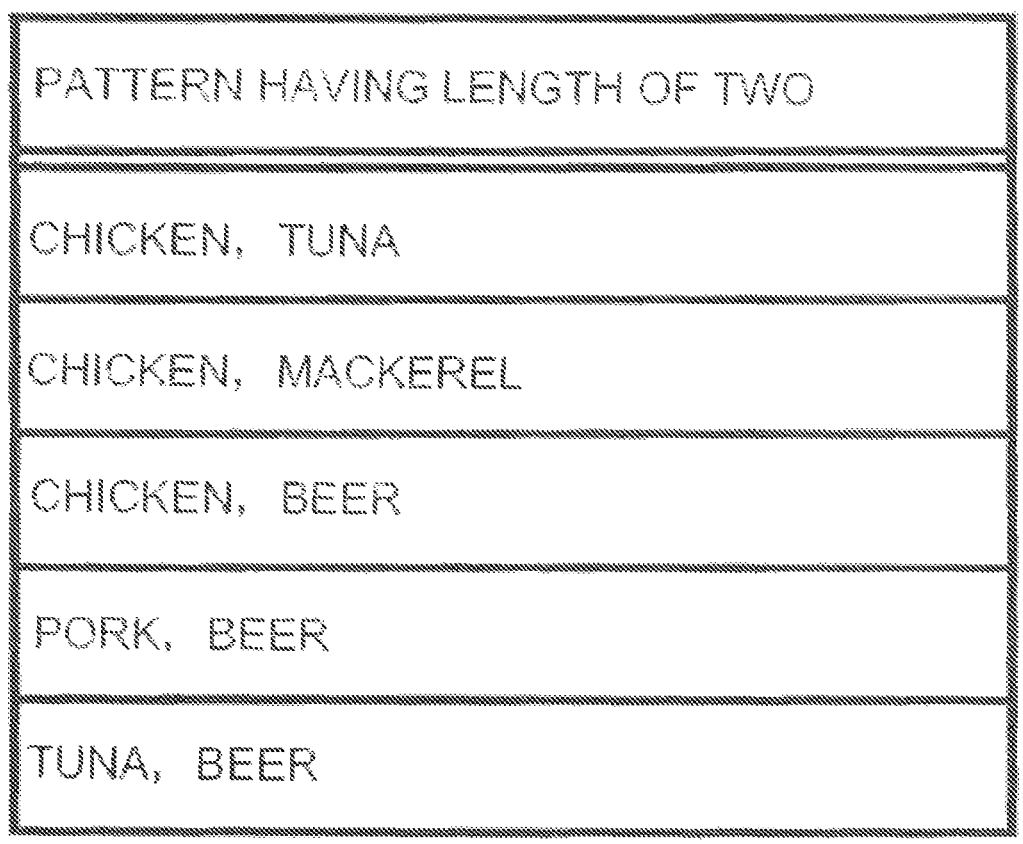
FIG. 11 A diagram showing exemplary patterns having a length of 2 stored in the pattern storing section.

At step S9, the candidate for pattern determined by the candidate evaluating section 70 to be registered is stored in the pattern storing section 80 as the pattern having the characteristic combination of items. For example, when the association support is calculated for the candidate patterns having the pattern length of 2 as shown in FIG. 10, the minimum support stored in the data storing section 10 is 40% in this example and thus it is determined at step S8 that the reference value is satisfied in the candidate patterns "CHICKEN, TUNA," "CHICKEN, MACKEREL," "CHICKEN, BEER," "PORK, bear," and "TUNA, BEER" of the ten candidate patterns shown in FIG. 10 and those five patterns are registered as patterns in the pattern storing section 80 as shown in FIG. 11. For the candidate patterns "CHICKEN, PORK," "PORK, TUNA," "PORK, MACKEREL," "TUNA, MACKEREL," and "MACKEREL, BEER," it is determined at step S8 that the reference value is not satisfied, and those patterns are not stored in the pattern storing section 80 and the data of the candidate patterns is discarded. The candidate patterns "CHICKEN, PORK," "PORK, TUNA," "PORK, MACKEREL," "TUNA, MACKEREL," and "MACKEREL, BEER" are excluded from possible patterns for producing candidate patterns having a length of 3.

In the example, when the processing from step S6 to step S9 is completed for all the ten second order candidate patterns shown in FIG. 10, the processing is returned to step S4 after step S5 to start the production of a third order candidate pattern having a length of 3.

The pattern storing section 80 stores, in addition to the frequent items shown in FIG. 7, the patterns having a length of 2 (second order patterns) as shown in FIG. 11 in the order of "CHICKEN, TUNA," "CHICKEN, MACKEREL," "CHICKEN, BEER," "PORK, BEER," and then "TUNA, BEER" in accordance with the priorities given to the items described above. In this state, the candidate pattern producing section 40 sets the pattern length m to 2 at step S41.

Then, after step S42, the candidate pattern producing section 40 takes out all the patterns having a length m of 2 shown in FIG. 11 (step S43) and determines whether or not the candidate pattern producing condition is satisfied in order to combine two of the patterns having the length of 2 (step S44).

For the candidate pattern producing condition at step S44, the length m of 2 means that the number of common items is one at maximum, and the patterns "CHICKEN, TUNA" and "CHICKEN, MACKEREL" have "CHICKEN" in common which is the "(m−1)th pattern" or "the first item" and have different items at the last, so that the candidate pattern producing condition is satisfied. In contrast, the patterns "CHICKEN, TUNA" and "PORK, BEER" do not have a "(m−1)th pattern" or "the first item" in common and thus the candidate pattern producing condition is not satisfied.

The candidate pattern producing section 40 determines whether or not the candidate pattern producing condition is satisfied in this manner at step S44, determines that the three sets "CHICKEN, TUNA" and "CHICKEN, MACKEREL," "CHICKEN, TUNA" and "CHICKEN, BEER," and "CHICKEN, MACKEREL" and "CHICKEN, BEER" satisfy the candidate pattern producing condition, and takes out these three sets at step S45. At step S46, the candidate pattern producing section 40 produces, as third order candidate patterns having a length of 3, a pattern "CHICKEN, TUNA, MACKEREL" from the patterns "CHICKEN, TUNA" and "CHICKEN, MACKEREL," a pattern "CHICKEN, TUNA, BEER" from the patterns "CHICKEN, TUNA" and "CHICKEN, BEER," and a pattern "CHICKEN, MACKEREL, BEER" from the patterns "CHICKEN, MACKEREL" and "CHICKEN, BEER" (see FIG. 12). The information of the produced three candidate patterns "CHICKEN, TUNA, MACKEREL," "CHICKEN, TUNA, BEER," and "CHICKEN, MACKEREL, BEER" is supplied to the candidate frequency calculating section 50. Then, the processing from step S5 to step S9 described above is performed for each of the candidate patterns. When the processing is completed for all the three candidate patterns, the processing is returned from step S9 to step S5.

Specifically, at step S5, the candidate frequency calculating section 50 takes one unprocessed candidate pattern "CHICKEN, TUNA, MACKEREL" out of the candidate patterns supplied from the candidate pattern producing section 40, and performs the frequency calculation processing at step S6. Since the candidate pattern "CHICKEN, TUNA, MACKEREL" is included in the transactions A01 and A05, the frequency is calculated at "2" by the candidate frequency calculating section 50 (step S6), and the support is calculated at 40(%) by the candidate evaluation value calculating section 60 (step S71).

Subsequently, the candidate evaluation value calculating section 60 extracts "CHICKEN, TUNA," "CHICKEN, MACKEREL," and "TUNA, MACKEREL" as all the combinations of two items from the candidate pattern "CHICKEN, TUNA, MACKEREL" (step S72), extracts 0, 0, and 0.5 as the association degrees for the combinations (step S73), and calculates, from the extracted association degrees, the weight of the first term of the expression 2 described above at 0.5 (1−max{0,0,0.5} or 1−0.5) (step S74). Since the support of the candidate pattern "CHICKEN, TUNA, MACKEREL" is calculated at "40," the candidate evaluation value calculating section 60 calculates the association support f(p) of "CHICKEN, TUNA, MACKEREL" at 20% (0.5×40) at step S75 (see FIG. 12). Since the association support is lower than the minimum support (40%) (NO at step S8), the processing is returned to step S5 without registering this candidate pattern as a pattern.

Subsequently, at step S5, the candidate frequency calculating section 50 takes one unprocessed candidate pattern "CHICKEN, TUNA, BEER" out of the candidate patterns having a length of 3 supplied from the candidate pattern producing section 40 and performs the frequency calculation processing at step S6. Since the candidate pattern "CHICKEN, TUNA, BEER" is included in the transactions A01 and A03, the frequency is calculated at "2" by the candidate frequency calculating section 50 (step S6), and the support is calculated at 40(%) by the candidate evaluation value calculating section 60 (step S71).

Then, the candidate evaluation value calculating section 60 extracts "CHICKEN, TUNA," "CHICKEN, BEER," and "TUNA, BEER" as all the combinations of two items from the candidate pattern "CHICKEN, TUNA, BEER" (step S72), extracts 0, 0, and 0 as the association degrees for the combinations (step S73), and calculates, from the extracted association degrees, the weight of the first term of the expression 2 described above at 1 (1−max{0,0,0} or 1−0) (step S74). Since the support of the candidate pattern "CHICKEN, TUNA, BEER" is calculated at "40," the candidate evaluation value calculating section 60 calculates the association support f(p) of "CHICKEN, TUNA, BEER" at 40% (1×40) at step S75 (see FIG. 12). Since the association support is equal to or higher than the minimum support (40%), the candidate pattern "CHICKEN, TUNA, BEER" is stored in the pattern storing section 80 at step S9 as a "pattern" or "having a characteristic combination of items" (see FIG. 13).

Then, at step S5, the candidate frequency calculating section 50 takes out one unprocessed candidate pattern "CHICKEN, MACKEREL, BEER" out of the candidate patterns supplied from the candidate pattern producing section 40 and performs the frequency calculation processing at step S6. Since the candidate pattern "CHICKEN, MACKEREL, BEER" is included only in the transaction A01, the frequency is calculated at "1" by the candidate frequency calculating section 50 (step S6), and the support is calculated at 20(%) by the candidate evaluation value calculating section 60 (step S71).

Subsequently, the candidate evaluation value calculating section 60 extracts "CHICKEN, MACKEREL," "CHICKEN, BEER," and "MACKEREL, BEER" as all the combinations of two items from the candidate pattern "CHICKEN, MACKEREL, BEER" (step S72), extracts 0, 0, and 0 as the association degrees for the combinations (step S73), and calculates, from the extracted association degrees, the weight of the first term of the expression 2 described above at 1 (1−max{0,0,0} or 1−0) (step S74). Since the support of the candidate pattern "CHICKEN, MACKEREL, BEER" is calculated at "20," the candidate evaluation value calculating section 60 calculates the association support f(p) of "CHICKEN, MACKEREL, BEER" at 20% (1×20) at step S75 (see FIG. 12). Since the association support is lower than the minimum support (40%) (NO at step S8), the processing is returned to step S5 without registering this candidate pattern as a pattern.

Figure 13:
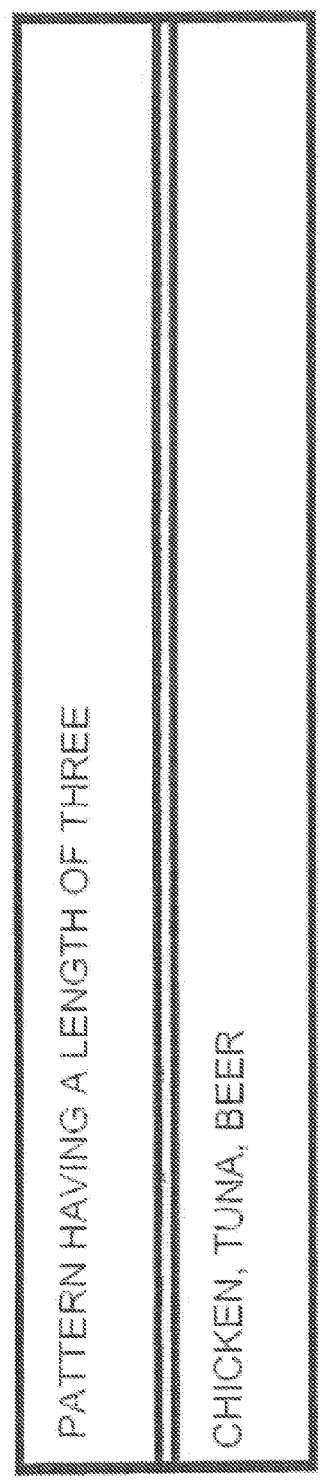
FIG. 13 A diagram showing an exemplary pattern having a length of 3 stored in the pattern storing section.

When the processing from step S6 to step S9 is completed for all the three third order candidate patterns shown in FIG. 12 in this example, the processing is returned to step S4 after step S5. Although the pattern length m is set to 3 in this case (step S41), the pattern storing section 80 stores only one pattern having a length m of 3 as shown in FIG. 13, and the candidate pattern producing section 40 cannot take out a combination of patterns satisfying the candidate pattern producing condition to produce a candidate pattern having a length of 4 (NO at step S42). In this case, it is determined that the production of a candidate pattern by the candidate pattern producing section 40 at step S45 cannot be performed, and the processing in the apparatus is finished.

As described above, for the pattern length of 3, only the candidate pattern "CHICKEN, TUNA, BEER" is extracted as the pattern from the three candidate patterns as shown in FIG. 13 and is registered in the pattern storing section 80. Specifically, the candidate pattern "CHICKEN, MACKEREL, TUNA" having the same frequency "2" but including the items with the high association degree is not extracted since the weight and the extraction evaluation value (association support) are calculated at relatively low values. Also, the candidate pattern "CHICKEN, MACKEREL, BEER" consisting of the items with a low association degree is not extracted since the frequency is low and the association support is calculated at a low value.

As shown in the example described above, the association supports f(p) of the candidate patterns having the length of 2, "CHICKEN, MACKEREL," "CHICKEN, BEER," and "MACKEREL, BEER," are 40%, 60%, and 20%, respectively (see FIG. 10), and the association support f(p) of the candidate pattern "CHICKEN, MACKEREL, BEER" including those three patterns and having the length of 3 is 20% (see FIG. 12). Therefore, it can be seen from the results of the calculation by the candidate evaluation value calculating section 60 using the expression 2 that, as the pattern length increases, the association support serving as the extraction evaluation value monotonously decreases.

As described above, the pattern extracting apparatus 100 of the present embodiment takes account of the association between items in calculating the extraction evaluation value for the candidate pattern to calculate the weight of the candidate pattern including items having a high association at a relatively low value, thereby making it relatively difficult to extract the candidate pattern including items having the high association. This can prevent the extraction of the pattern consisting of items having the high association which may be obvious to the analyzer and can achieve the efficient extraction of the pattern consisting of items having a low association which may interest the analyzer.

More specifically, if a pattern is extracted only on the basis of the minimum support without considering the association between items, the candidate patterns having a frequency of appearance of 2 such as "CHICKEN, PORK" both included in meat and "MACKEREL, TUNA" both included in fish are also extracted as the patterns from the transactions in FIG. 2. Such a pattern consisting of items having a high association gives the impression of being obvious (natural) to the analyzer and is not an interesting pattern. In contrast, the extraction control in the pattern extracting apparatus 100 of the present embodiment can be performed to extract the candidate pattern having a certain level of frequency of appearance and consisting of items having a low association to avoid the extraction of "CHICKEN, PORK" and "MACKEREL, TUNA" as the pattern.

The illustrated transaction serving as the target information described in the present embodiment has an extremely small structure for simplifying the description. In reality, however, more types of items are used and much more transactions may be targeted. If the pattern is extracted only on the basis of the minimum support without considering the association between items, a number of patterns consisting of items having a high association may be extracted, and the pattern formed of commodities (items) of different categories such as "PORK, MACKEREL" may be mixed with many patterns formed of commodities of the same type. Consequently, if the pattern is extracted only on the basis of the minimum support without considering the association between items, it may be significantly difficult to efficiently find the pattern interesting the analyzer.

In contrast, the pattern extraction control of the present embodiment involves considering the association between items, extracting the association degrees between the items included in the candidate pattern from the inter-item information storing section 20, calculating the weight based on the extracted association degrees, and applying the weight to the support based on the frequency of appearance of the candidate pattern in the transactions to calculate the extraction evaluation value as described above, achieving the efficient extraction of the pattern consisting of the items having a low association. Therefore, according to the pattern extracting apparatus 100 of the present embodiment, the important pattern interesting the analyzer can be efficiently found.

The configuration of the pattern extracting apparatus is not limited to the embodiment described above. For example, although the expression 2 is used for calculating the association support serving as the extraction evaluation value, the association support to provide the monotony can be defined as shown in the following expressions 3 and 4.

[Expression 3]

$$f(p) = \left[1 - \min\left\{, \sum_{it_i, it_j \in p, it_i \neq it_j} s(it_i, it_j)\right\}\right] \times \frac{\text{number of transactions including pattern } p}{\text{total number of transactions}} \times 100 \quad \text{(expression 3)}$$

[Expression 4]

$$f(p) = \prod_{it_i, it_j \in p, it_i \neq it_j} s(it_i, it_j) \times \frac{\text{number of transactions including pattern } p}{\text{total number of transactions}} \times 100 \quad \text{(expression 4)}$$

When the expression 3 is used, the association degrees between items are summed in a first term serving as the weight, and if the sum is equal to or higher than 1, the values of the first term and thus the association support f(p) are 0. It can be seen that the expression 3 also defines the association support which monotonously decreases as the pattern length increases (the number of items constituting the pattern increases).

When the expression 4 is used, the association degrees between items are multiplied in the first term serving as the weight. If the values in the association degree matrix of the embodiment are used without any change, the values of the first term and thus the association support f(p) are 0 for "CHICKEN, BEER," by way of example. In this case, the association degree between the same items may be set to 0 and the association degree between the items with the lowest association may be set to 1 in another embodiment of the inter-item knowledge.

Although the embodiment described above performs the determination at step S37 by the item extracting section 30 in which the processing of the apparatus is finished when no frequent item exists in the pattern storing section 80, the present invention is not limited thereto. When it is determined that no frequent item exists at step S37, the item extracting section 30 may perform the processing of frequent item extraction (step S3) again by subtracting a predetermined value (for example, 20%) from the value of the minimum support (40% in this example) to extract any item having a support equal to or higher than the minimum support after the subtraction as a frequent item. In this case, the analyzer is preferably notified of the fact that the value of the minimum support is reduced and of the reduced value of the minimum support through display on the display section as appropriate.

In contrast to the above case, when an extremely large number of frequent items are extracted and stored in the pattern storing section 80, specifically when the number of frequent items to be extracted is equal to or higher than a preset number or when a preset percentage (%) or more of the items extracted at step S31 are stored as frequent items, then the item extracting section 30 may perform the processing at step S3 again by increasing the value of the minimum support by a predetermined value (for example, 20%) to extract any item having a support equal to or higher than the changed minimum support as a frequent item. In this case, the analyzer is preferably notified of the fact that the value of the minimum support is increased and of the increased value of the minimum support through display on the display section as appropriate.

Figure 14:
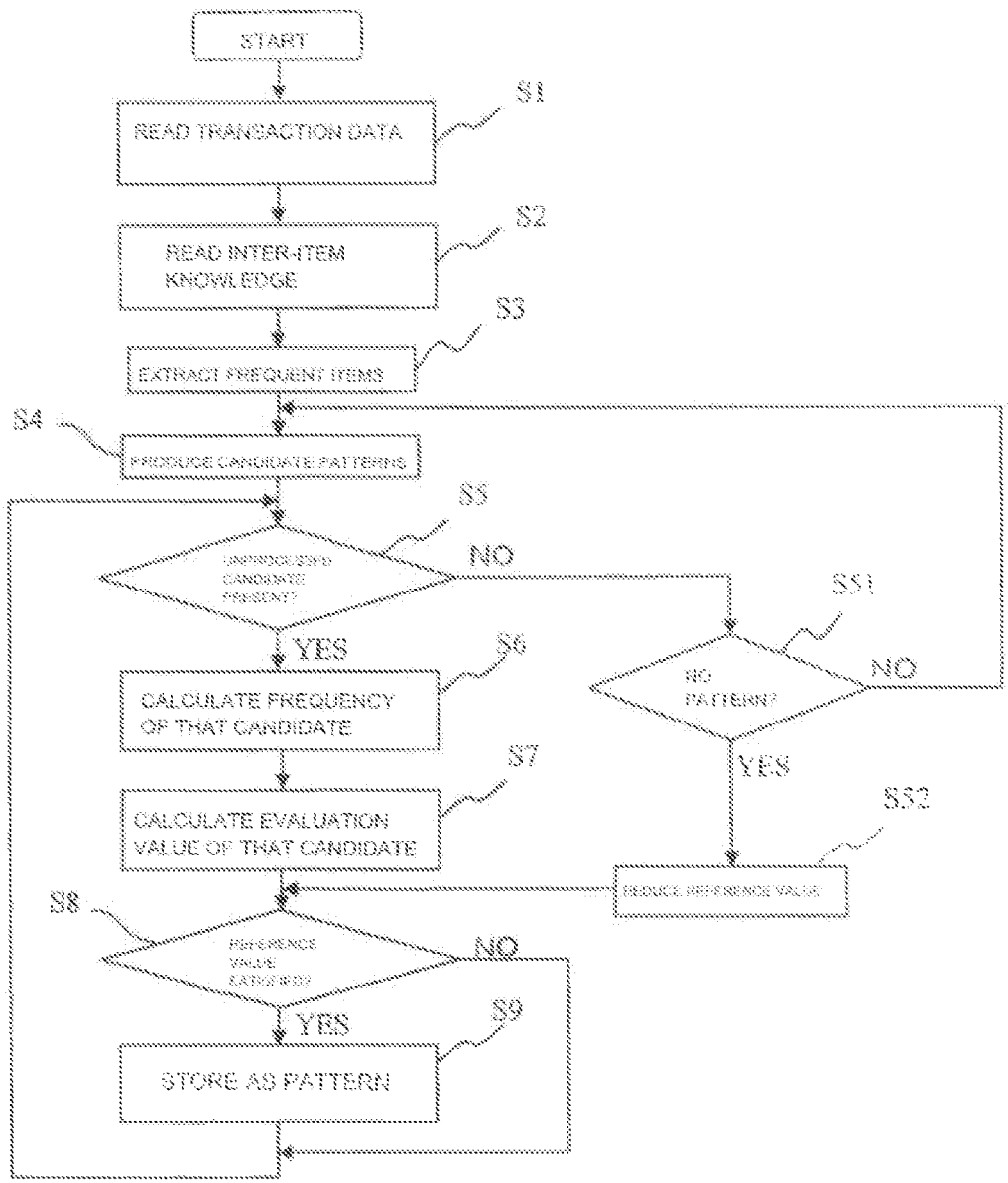
FIG. 14 A flow chart for explaining the operation in another embodiment of the pattern extracting apparatus.

The similar processing may be performed on the minimum support for a candidate pattern having a length of 2 or more. FIG. 14 is a flow chart for explaining the operation of another embodiment of the pattern extracting apparatus. When it is determined that no unprocessed candidate exists at step S5, the presence or absence of any pattern in the pattern storing section 80 is determined at step S51, and the processing is returned to step S4 when any pattern exists, or when no pattern exists, the processing of subtracting a predetermined vale (for example, 20%) from the value of minimum support (40% in this example) is performed at step S52. The determination processing at step S8 is performed with the changed minimum support for each candidate pattern.

When the number of the patterns stored in the pattern storing section 80 is lower than a preset number (is excessively small) or is higher than the preset number (is excessively large), the processing of reducing the value of the minimum support or the processing of increasing the value of the minimum support may be performed before the determination processing at step S8 for each candidate pattern.

Although the inter-item knowledge stored in the inter-item information storing section 20 is the association degree defined as the relationship between two items in the embodiment, the present invention is not limited thereto. The inter-item knowledge may be the association degree defined as the association degree between three or more items so as to provide the monotony with an increase in the number of items.

Although the embodiment has been illustrated in conjunction with the use of the pattern extracting apparatus 100 to find the characteristic combination of purchased commodities in sales of commodities, the present invention is not limited thereto and may be used for other various businesses. For example, when the apparatus is used to find a characteristic cause-and-effect relationship between the characteristics of a branch office and the type of a paperwork mistake in banking, one transaction can be used for each branch office, and the type of a mistake occurring in the branch office can be used as an item. In another example, when the apparatus is used to find the preference of an audience from the relationship between the characteristics of the audience and the viewing history in program recommendation, one transaction can be used for each audience, and a program watched by the audience can be used as an item.

Each of the processing operations described above can be realized as a computer-executable program, and a computer having the program installed thereon can run as an information processing apparatus which performs each of the processing operations according to the embodiment. For example, the program can be stored in an auxiliary storage device, not shown, a control section such as a CPU can read the program stored in the auxiliary storage device to a main storage device, and the control section can execute the program read to the main storage device to cause the computer to perform the processing operations according to the embodiment.

The program may be recorded on a computer-readable recording medium for use in a computer or may be downloaded to the computer through a network such as the Internet. Examples of the computer-readable recording medium include an optical disk such as a CD-ROM, a phase-change optical disk such as a DVD-ROM, a magneto-optical disk such as a Magneto-Optical (MO) disk and a Mini Disk (MD), a magnetic disk such as a floppy disk (R) and a removable hard disk, and a memory card such as a CompactFlash (R) card, a SmartMedia card, an SD memory card, and a memory stick. A hardware device such as a specially designed and configured integrated circuit (for example, an IC chip) is also an example of the recording medium.

Although the embodiment described above includes the components shown in FIG. 1 which are provided by a single computer, the present invention is not limited thereto. The components shown in FIG. 1 may be realized by different server apparatuses or the like as appropriate and be connected to each other into a computer system through a communication line such as a network.

Although the embodiment of the present invention has been described, the embodiment is presented as an example and is not intended to limit the scope of the present invention. The novel embodiment can be implemented in various other forms, and a variety of omissions, substitutions, and changes can be made without departing from the spirit or scope of the present invention. The embodiment and its modifications are included in the spirit and scope of the invention and included in the invention described in the claims and the equivalents.

DESCRIPTION OF THE REFERENCE NUMERALS

100 PATTERN EXTRACTING APPARATUS
10 DATA STORING SECTION
20 INTER-ITEM INFORMATION STORING SECTION
30 ITEM EXTRACTING SECTION
40 CANDIDATE PATTERN PRODUCING SECTION
50 CANDIDATE FREQUENCY CALCULATING SECTION
60 CANDIDATE EVALUATION VALUE CALCULATING SECTION
70 CANDIDATE EVALUATING SECTION
80 PATTERN STORING SECTION

The invention claimed is:

1. A pattern extracting apparatus extracting, from a plurality of items included in target information pieces, a pattern of a combination of two or more of the items different from each other, comprising:
a first storing section storing the plurality of target information pieces;
a candidate pattern producing section producing candidate patterns each formed of two or more of the items different from each other based on each of the items included in each of the plurality of target information pieces;
a candidate evaluation value calculating section calculating an extraction evaluation value of the candidate pattern;
a pattern extracting section determining any of the candidate patterns having the calculated extraction evaluation value satisfying a predetermined threshold value and extracting the candidate pattern satisfying the threshold value;
a second storing section storing an association degree between the items,
wherein the candidate evaluation value calculating section extracts the association degree between the items included in the candidate pattern from the second storing section, calculates an association degree of the candidate pattern based on the extracted association degree between the items and a frequency of appearance at which the candidate pattern appears in each of the plurality of target information pieces, simultaneously evaluates the association degree of the candidate pattern and the frequency of appearance of the candidate pattern, and calculates the extraction evaluation value,
wherein the candidate evaluation value calculating section calculates the extraction evaluation value using the calculated frequency of appearance and the evaluated association degree of the candidate pattern, such that the calculated extraction evaluation value is lower as the calculated frequency of appearance is lower and as the evaluated association degree of the candidate pattern is higher, and
wherein the candidate evaluation value calculating section calculates the extraction evaluation value of the candidate pattern such that the calculated extraction evaluation value monotonously decreases as the number of the items constituting the candidate pattern increases, based on a combined degree of the candidate pattern for each association degree between the items constituting the candidate pattern in accordance with a number of combinations of the items; and
provides for analysis the pattern of the combination of the two or more of the items different from each other when the calculated extraction evaluation value satisfies the predetermined threshold value.

2. The pattern extracting apparatus according to claim 1, wherein the candidate evaluation value calculating section calculates the extraction evaluation value based on a definition in which, when an arbitrary candidate pattern p1 is a subset of an arbitrary candidate pattern p2, monotony is achieved such that the extraction evaluation value of the candidate pattern p2 is equal to or lower than the extraction evaluation value of the candidate pattern p1.

3. The pattern extracting apparatus according to claim 1, wherein the candidate evaluation value calculating section calculates the extraction evaluation value based on a weight, which is based on the association degree of the candidate pattern and the frequency of appearance of the candidate pattern, and extracts the association degree between the items included in the candidate pattern from the second storing section, subtracts the extracted association degree from a predetermined value, and uses the result of the subtraction as the weight.

4. The pattern extracting apparatus according to claim 1, further comprising a pattern storing section storing the candidate pattern satisfying the threshold value extracted by the pattern extracting section,
wherein the candidate pattern producing section sets a length m of the pattern corresponding to the number of items and extracts two patterns, which each have the set length m and includes the same item from a first length to (m−1)th length and a different item at a last length in the pattern storing section, and produces the candidate pattern having a length of m+1 in which m−1 items common to the extracted two patterns are followed by the different items arranged in accordance with an order based on predetermined priorities of items.

5. A pattern extracting method of extracting, from a plurality of items included in target information pieces, a pattern of a combination of two or more of the items different from each other, the method comprising:

storing the plurality of target information pieces in a storage area;

producing candidate patterns each formed of two or more of the items different from each other based on each of the items included in each of the plurality of target information pieces;

storing an association degree between the items in a storage area;

calculating an extraction evaluation value of the candidate pattern;

determining any of the candidate patterns having the calculated extraction evaluation value satisfying a predetermined threshold value and extracting the candidate pattern satisfying the threshold value, wherein the calculating the extraction evaluation value of the candidate pattern includes extracting the association degree between the items included in the candidate pattern from the storage area, calculating an association degree of the candidate pattern based on the extracted association degree between the items and a frequency of appearance at which the produced candidate pattern appears in each of the plurality of target information pieces, evaluating simultaneously the association degree of the candidate pattern and the frequency of appearance of the candidate pattern, and calculating the extraction evaluation value, wherein the calculating the extraction evaluation value of the candidate pattern includes calculating the extraction evaluation value using the calculated frequency of appearance and the evaluated association degree of the candidate pattern, such that the calculated extraction evaluation value is lower as the calculated frequency of appearance is lower and as the evaluated association degree of the candidate pattern is higher, and wherein the calculating the extraction evaluation value of the candidate pattern includes calculating the extraction evaluation value of the candidate pattern such that the calculated extraction evaluation value monotonously decreases as the number of the items constituting the candidate pattern increases, based on a combined degree of the candidate pattern for each association degree between the items constituting the candidate pattern in accordance with a number of combinations of the items; and providing for analysis the pattern of the combination of the two or more of the items different from each other when the calculated extraction evaluation value satisfies the predetermined threshold value.

6. The pattern extracting method according to claim 5, further comprising storing the candidate pattern satisfying the threshold value, wherein the producing sets a length in of the pattern corresponding to the number of items and extracts two patterns, which each have the set length in and includes the same item from a first length to (m−1)th length and a different item at a last length in the stored candidate patterns satisfying the threshold value, and produces the candidate pattern having a length of m+1 in which m−1 items common to the extracted two patterns are followed by the different items arranged in accordance with an order based on predetermined priorities of items.

7. A non-transitory computer readable medium including computer executable instructions causing a computer to perform functions, the computer including a predetermined storage area storing target information pieces including a plurality of items and an association degree between the items, the computer performing pattern extraction processing of extracting a pattern of a combination of two or more of the items different from each other existing in the target information pieces, the functions comprising:

producing candidate patterns each formed of two or more of the items different from each other based on each of the items included in each of the plurality of target information pieces;

calculating an extraction evaluation value of the candidate pattern;

determining any of the candidate patterns having the calculated extraction evaluation value satisfying a predetermined threshold value and extracting the candidate pattern satisfying the threshold value, wherein the calculating the extraction evaluation value of the candidate pattern includes extracting the association degree between the items included in the candidate pattern from the storage area, calculating an association degree of the candidate pattern based on the extracted association degree between the items and a frequency of appearance at which the produced candidate pattern appears in each of the plurality of target information pieces, evaluating simultaneously the association degree of the candidate pattern and the frequency of appearance of the candidate pattern, and calculating the extraction evaluation value, wherein the calculating the extraction evaluation value of the candidate pattern includes calculating the extraction evaluation value using the calculated frequency of appearance and the evaluated association degree of the candidate pattern, such that the calculated extraction evaluation value is lower as the calculated frequency of appearance is lower and as the evaluated association degree of the candidate pattern is higher, and wherein the calculating the extraction evaluation value of the candidate pattern includes calculating the extraction evaluation value of the candidate pattern such that the calculated extraction evaluation value monotonously decreases as the number of the items constituting the candidate pattern increases, based on a combined degree of the candidate pattern for each association degree between the items constituting the candidate pattern in accordance with a number of combinations of the items; and providing for analysis the pattern of the combination of the two or more of the items different from each other when the calculated extraction evaluation value satisfies the predetermined threshold value.

8. The non-transitory computer readable medium according to claim 7, further comprising storing the candidate pattern satisfying the threshold value, wherein the producing sets a length m of the pattern corresponding to the number of items and extracts two patterns, which each have the set length m and includes the same item from a first length to (m−1)th length and a different item at a last length in the stored candidate patterns satisfying the threshold value, and produces the candidate pattern having a length of m+1 in which m−1 items common to the extracted two patterns are followed by the different items arranged in accordance with an order based on predetermined priorities of items.

* * * * *